US008275765B2

(12) United States Patent
Li et al.

(10) Patent No.: US 8,275,765 B2
(45) Date of Patent: Sep. 25, 2012

(54) METHOD AND SYSTEM FOR AUTOMATIC OBJECTS CLASSIFICATION

(75) Inventors: Jianqiang Li, Beijing (CN); Xin Meng, Beijing (CN); Yu Zhao, Beijing (CN); Jingwei Shi, Beijing (CN)

(73) Assignee: NEC (China) Co., Ltd., Beijing (CN)

( * ) Notice: Subject to any disclaimer, the term of this patent is extended or adjusted under 35 U.S.C. 154(b) by 292 days.

(21) Appl. No.: 12/607,369

(22) Filed: Oct. 28, 2009

(65) Prior Publication Data
US 2010/0114855 A1 May 6, 2010

(30) Foreign Application Priority Data

Oct. 30, 2008 (CN) .......................... 2008 1 0173612

(51) Int. Cl.
*G06F 17/30* (2006.01)
(52) U.S. Cl. .. 707/722; 707/737; 707/956; 707/E17.089
(58) Field of Classification Search ............ 707/999.103, 707/722, 953, E17.089, 737, 956
See application file for complete search history.

(56) References Cited

U.S. PATENT DOCUMENTS

| | | | | |
|---|---|---|---|---|
| 5,694,559 A * | 12/1997 | Hobson et al. | ............... | 715/705 |
| 6,185,550 B1 * | 2/2001 | Snow et al. | ............................. | 1/1 |
| 6,460,034 B1 * | 10/2002 | Wical | .................................. | 1/1 |
| 6,502,091 B1 * | 12/2002 | Chundi et al. | ................. | 707/738 |
| 6,598,042 B1 * | 7/2003 | Kienan | .............................. | 1/1 |
| 6,751,600 B1 * | 6/2004 | Wolin | .............................. | 706/12 |
| 6,785,683 B1 * | 8/2004 | Zodik et al. | ........................... | 1/1 |
| 6,947,936 B1 * | 9/2005 | Suermondt et al. | ................... | 1/1 |
| 7,124,148 B2 * | 10/2006 | Sauermann | .................... | 707/740 |
| 7,349,917 B2 * | 3/2008 | Forman et al. | ......................... | 1/1 |
| 7,536,413 B1 * | 5/2009 | Mohan et al. | ........................ | 1/1 |
| 7,668,889 B2 * | 2/2010 | Edwards et al. | .............. | 707/766 |
| 7,702,674 B2 * | 4/2010 | Hyder et al. | ................. | 707/710 |
| 7,788,269 B2 * | 8/2010 | Behnen et al. | ................ | 707/754 |
| 7,860,946 B1 * | 12/2010 | Bulleit et al. | ................ | 709/218 |
| 7,870,039 B1 * | 1/2011 | Dom et al. | ................. | 705/26.41 |
| 8,051,056 B2 * | 11/2011 | Suzuki et al. | ................ | 707/705 |

(Continued)

FOREIGN PATENT DOCUMENTS

JP 2005182280 A 7/2005

(Continued)

OTHER PUBLICATIONS

Wang et al., "Learn From Web Search Logs to Organize Search Results", SIGIR 2007 Proceedings, Section 4: Classification and Clustering, Jul. 23-27, 2007, pp. 87-94.*

(Continued)

*Primary Examiner* — Christyann Pulliam
*Assistant Examiner* — Phuong Thao Cao
(74) *Attorney, Agent, or Firm* — Sughrue Mion, PLLC

(57) ABSTRACT

The present invention provides a method and system for automatic objects classification. The method comprises: acquiring a set of objects; classifying the objects based on query log to generate a first classification result; classifying the objects based on ontological information to generate a second classification result; and semantically fusing the first and second classification results to generate a final classification result. According to the present invention, compared with the prior arts, by semantically fusing the query log-based classification result and the ontology-based classification result, the accuracy and user-friendness of the object classification can be improved.

13 Claims, 11 Drawing Sheets

U.S. PATENT DOCUMENTS

| | | | |
|---|---|---|---|
| 8,112,448 B2 * | 2/2012 | Takayama et al. | 707/797 |
| 2002/0169770 A1 * | 11/2002 | Kim et al. | 707/5 |
| 2003/0018658 A1 * | 1/2003 | Suermondt et al. | 707/204 |
| 2003/0115191 A1 * | 6/2003 | Copperman et al. | 707/3 |
| 2003/0144996 A1 * | 7/2003 | Moore, Jr. | 707/3 |
| 2004/0064438 A1 * | 4/2004 | Kostoff | 707/1 |
| 2004/0120558 A1 * | 6/2004 | Sabol et al. | 382/128 |
| 2004/0120580 A1 * | 6/2004 | Sabol et al. | 382/224 |
| 2004/0267893 A1 * | 12/2004 | Lin | 709/207 |
| 2005/0108200 A1 * | 5/2005 | Meik et al. | 707/3 |
| 2005/0138018 A1 * | 6/2005 | Sakai et al. | 707/3 |
| 2006/0031217 A1 * | 2/2006 | Smith et al. | 707/5 |
| 2006/0036581 A1 * | 2/2006 | Chakrabarti et al. | 707/3 |
| 2006/0074891 A1 * | 4/2006 | Chandrasekar et al. | 707/3 |
| 2006/0110035 A1 * | 5/2006 | Luo et al. | 382/170 |
| 2006/0224579 A1 * | 10/2006 | Zheng | 707/5 |
| 2007/0005689 A1 * | 1/2007 | Leighton et al. | 709/203 |
| 2007/0025704 A1 * | 2/2007 | Tsukazaki et al. | 386/96 |
| 2007/0124200 A1 * | 5/2007 | Simons et al. | 705/14 |
| 2007/0169613 A1 * | 7/2007 | Kim et al. | 84/609 |
| 2007/0185865 A1 * | 8/2007 | Budzik et al. | 707/5 |
| 2007/0192293 A1 * | 8/2007 | Swen | 707/3 |
| 2007/0208728 A1 * | 9/2007 | Zhang et al. | 707/5 |
| 2007/0214131 A1 * | 9/2007 | Cucerzan et al. | 707/5 |
| 2007/0239734 A1 * | 10/2007 | Arellanes et al. | 707/10 |
| 2007/0250488 A1 * | 10/2007 | Lee | 707/3 |
| 2007/0255755 A1 * | 11/2007 | Zhang et al. | 707/104.1 |
| 2007/0266020 A1 * | 11/2007 | Case et al. | 707/5 |
| 2008/0247609 A1 * | 10/2008 | Feris et al. | 382/118 |
| 2009/0048876 A1 * | 2/2009 | Bonissone et al. | 705/4 |
| 2009/0100036 A1 * | 4/2009 | Bedrax-Weiss et al. | 707/5 |
| 2009/0185739 A1 * | 7/2009 | Amini et al. | 382/144 |
| 2009/0307198 A1 * | 12/2009 | Zhang et al. | 707/4 |
| 2010/0030801 A1 * | 2/2010 | Takayama et al. | 707/102 |
| 2010/0088351 A1 * | 4/2010 | Dehmann et al. | 707/803 |
| 2010/0100443 A1 * | 4/2010 | Hoashi et al. | 705/14.54 |
| 2010/0131467 A1 * | 5/2010 | Prahlad et al. | 707/617 |
| 2010/0131495 A1 * | 5/2010 | Murdock et al. | 707/722 |
| 2010/0211270 A1 * | 8/2010 | Chin et al. | 701/44 |
| 2010/0257169 A1 * | 10/2010 | Kim et al. | 707/737 |
| 2011/0145225 A1 * | 6/2011 | Parikh et al. | 707/722 |
| 2011/0231423 A1 * | 9/2011 | Lopiano | 707/760 |
| 2011/0264649 A1 * | 10/2011 | Hsiao et al. | 707/722 |

FOREIGN PATENT DOCUMENTS

WO    WO 2009/031759    *    3/2009

OTHER PUBLICATIONS

Beitzel et al., "Automatic Classification of Web Queries Using Very Large Unlabeled Query Logs", ACM Transactions on Information System, vol. 25, No. 2, Article 9, Apr. 2007, 29 pages.*

Chemudugunta et al., "Combining Concept Hierarchies and Statistical Topic Model", In the 17th AMC Conference on Information and Knowledge Management, 2008, 2 pages.*

Han et al., "Dynamic Generation and Refinement of Concept Hierarchies for Knowledge Discovery in Databases", In Proceedings AAAI'94 Workshop Knowledge Discovery in Databases (KDD'94), pp. 157-168 (12 pages), Jul. 1994.*

Kules et al., "Categorizing Web Search Results into Meaningful and Stable Categories Using Fast-Feature Techniques", In Proceedings of the Sixth ACM/IEEE—CS Joint Conference on Digital Libraries, ACM Press, 2009, pp. 210-219 (10 pages).*

Rouane et al., "Merging Conceptual Hierarchies using Concept Lattices", 2004, 8 pages, accessed online at <http://www.i3s.unice.fr/maspeghi2004/final-version/m_rouane.pdf> on Jul. 13, 2012.*

Singh et al., "Hierarchical Classification of Web Search Results Using Personalized Ontologies", In Proceedings of the 3rd International Conference on Universal Access in Human-Computer Interaction HCI International 2005, Jul. 2005, 10 pages.*

First Office Action issued Nov. 4, 2011 by the Japanese Patent Office in counterpart Japanese Patent Application No. 2009-243546.

Ryutaro Ichise, "The Journal of Information Science and Technology Association", Japan, Feb. 1, 2008, vol. 58, No. 2, pp. 78-83.

* cited by examiner

Cluster related queries of target query "WarRoom"

Related categories (Query List) generated from left clustering strategy:

METHOD AND SYSTEM FOR AUTOMATIC OBJECTS CLASSIFICATION

FIELD OF THE INVENTION

The present invention generally relates to information retrieval and objects (e.g. documents, search results etc.) classification, and especially the method and system for automatic objects classification, which exploit the query histories-based classification results and ontological information-based classification results together for objects classification and organization.

BACKGROUND

With the electronic information explosion caused by Internet, a huge amount of diversified information is accumulated on the Web, and still continues to grow at a staggering rate. It is a challenging task to help net-citizens find useful information amongst this enormous information pool.

Information retrieval (IR) is the science of searching for information in a set of objects (e.g. documents), which can further be divided into searching for a piece of information contained in documents, searching for documents themselves, searching for metadata which describe documents, or searching within databases, whether relational stand-alone databases or hypertext networked databases such as the Internet or intranets, for texts, sounds, images or data. Originated from this long-established research discipline, web search engine (e.g., Google or Baidu) is a document retrieval system designed specifically to help find information stored on the Web, which allows one to ask for the contents that meet specific criteria (typically those containing a given word or phrase) and to retrieve a list of items that match those criteria.

Object classification is the activity of labeling objects (e.g. documents or natural language texts) with thematic categories from a predefined set, which can be applied in many usage scenarios of IR and text data mining, e.g., word sense disambiguation, document organization, text filtering, and web page retrieval. Object Clustering is the classification of objects into different groups, or more precisely, the partitioning of an object set, such as a document set, into subsets (clusters), so that the documents in each subset share some common trait.

Considering the fact that there are a large amount of returned results from these popular search engines, it is still difficult for the web users to find what they really want. The object clustering/classification techniques provide great potentials to enable an effective way to organize search results, which allows a user to navigate into relevant documents quickly.

As described above, the rapid growth of electronic media content makes search engines (for web pages or desktop documents) play critical role in helping people to find useful information. However, the large amount of returned results, which are often heterogeneous in topics and genres, would also be a great burden for the users to find their interested information.

There are many existing automatic information classification algorithms in the prior arts. For example, in Paper: Xuan-Hui Wang, ChengXiang Zhai, "Learn from Web Search Logs to Organize Search Results", SIGIR2007, pp. 87-94 (hereinafter, referred to as Reference 1), a search result classification method is provided, in which search results are organized by aspects learned from search engine logs. For another example, Japanese patent application 2005-182280 (hereinafter, referred to as Reference 2) provides another method for organizing search results, which first extracts object categories based on pre-stored ontological information, and then organizes the search results according to the extracted categories.

In the query log-based object classification methods, the category selection does not take background knowledge (i.e. ontology) into account. Thus, the classification accuracy is not good enough. In addition, since the solution depends too much on the history information, the discovered category information might not be familiar for the users. Therefore, the classification result is not user-friendly.

On the other hand, regarding ontological information-based object classification method, since it is restricted by pre-stored ontological information, the search result category set of ontology based classification method is inflexible and cannot reflect the change of users' interest.

SUMMARY OF THE INVENTION

The present invention is made in view of the above-mentioned deficiencies present in the prior arts. The objects classification solution of the present invention combines background knowledge provided by ontological information with historical information implied by the query log to improve quality of objects (e.g. documents or search results) classification.

According to the first aspect of the invention, it is provided a method for objects classification, comprising: acquiring a set of objects; classifying the objects based on query log to generate a first classification result; classifying the objects based on ontological information to generate a second classification result; and semantically fusing the first and second classification results to generate a final classification result.

According to the second aspect of the invention, it is provided a system for objects classification, comprising: an object acquiring means for acquiring a set of objects; a query log-based classification means for classifying the objects based on query log to generate a first classification result; an ontological information-based classification means for classifying the objects based on ontological information to generate a second classification result; and a semantic fusing means for semantically fusing the first and second classification results to generate a final classification result.

The objects classification method provided in the present invention mainly includes three steps: (1) query log-based object classification; (2) ontology-based object classification; (3) the semantic combination of the above two results.

First, in the query log-based object classification method, as described in Reference 1, because search engine query logs store related queries which reflect potential aspects (category sets) of search results, this method organizes search results by aspects learned from the search engine logs. Firstly, a user extracts related queries from query logs. Then, those related queries are clustered and the cluster centers can be treated as potential aspects. Finally, all the search results can be categorized into corresponding categories.

Second, regarding ontology-based object classification method, as described in Reference 2, because background knowledge reflected by ontological information is much easier to understand for users, this method classify the search results to aspects extracted from ontology. Firstly, according to the ontological information, a user annotates all the objects (e.g. documents) and the input query. Then, aspects (category sets) can be generated based on semantic connectivity analysis. Finally, all the search results are categorized into corresponding categories.

Finally, the semantic fusing step comprises the following three cases:
1) tune or refine the result of query log-based method according to the result of ontology-based method;
2) tune or refine the result of ontology-based method according to the result of query log-based method; and
3) combine the foregoing two aspects of results to derive a final object classification result.

According to the present invention, the classification accuracy can be improved, and it is also possible to provide user-friendly classification result display.

Without a reasonable objects category set, the pure accuracy of classification to category is meaningless to some degree. By adding a semantic framework, which is generated by ontology-based classification method, to the unstable category set that has been generated by the query log-based method, the present invention can generate dynamically an object category set, which has been corrected by ontology knowledge and reflects user query/search history, thereby improving the classification accuracy.

In addition, since the user understands the background knowledge of the ontological information well, the invention can provides user-friendly display of the search results.

The semantic alignment between the results from ontology-based and query-logs-based methods guarantees that the clustering result can reflect the change of the user's interests, so that category flexibility can be improved.

The foregoing and other features and advantages of the present invention can become more obvious from the following description in combination with the accompanying drawings. Please note that the scope of the present invention is not limited to the examples or specific embodiments described herein.

BRIEF DESCRIPTIONS OF THE DRAWINGS

The foregoing and other features of this invention may be more fully understood from the following description, when read together with the accompanying drawings in which.

DETAILED DESCRIPTION OF THE PREFERRED EMBODIMENTS

The exemplified embodiments of the present invention will be described with reference to the accompanying drawings below. It should be realized that the described embodiments are just used for the purpose of illustration. The scope of the present invention is not limited to any of the described specific embodiments.

The present invention relates to automatic objects classification. To simplify the explanation, documents as search results will be used as an example to elaborate the method and system according to the present invention. Of course, it is easy to realize by those skilled in the art that the present invention is not limited to this example, but can be more widely applied to other object classification-related fields.

Figure 1:
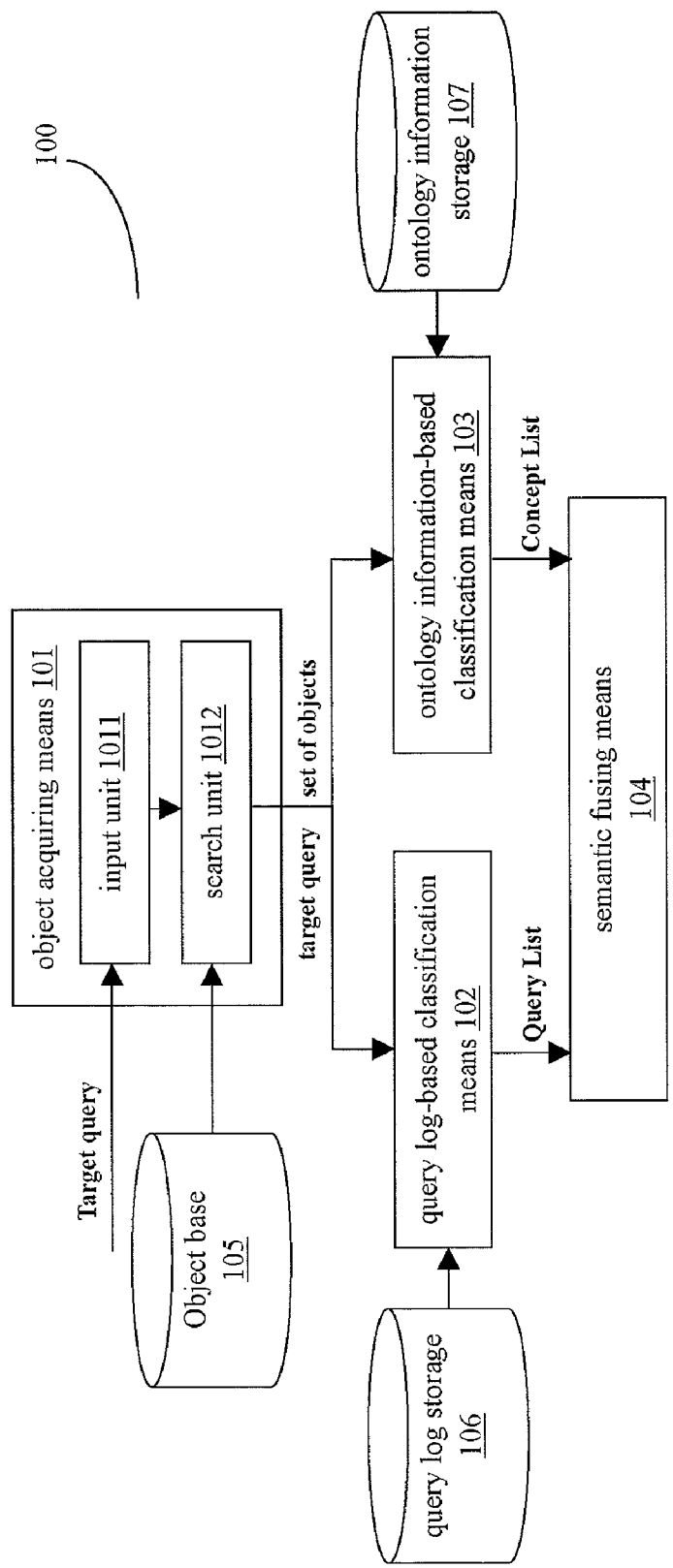
FIG. 1 is a block diagram for showing the internal structure of the object classification system 100 according to the embodiment of the present invention.

FIG. 1 is a block diagram for showing the internal structure of the object classification system 100 according to the embodiment of the present invention. As shown, the object classification system 100 mainly includes an object acquiring means 101, a query log-based classification means 102, an ontological information-based classification means 103 and a semantic fusing means 104. The query log-based classification means 102 implements a query log-based object classification by referring to the query log of the search engine stored in the query log storage 106, and the ontological information-based classification means 103 implements an ontological information-based object classification by referring to the ontological information from the ontological information storage 107. For example, the above-mentioned References 1 and 2 provide respectively two examples of the query log-based and ontology-based classification methods. Of course, it should be realized by those skilled in the art that the present invention is not limited only to the classification methods described in References 1 and 2, but can be applied to any query log-based and ontology-based classification methods that have been well known in the art.

In the example of FIG. 1, all the objects (e.g. documents) that are available to the user are stored in the objects base 105. The user inputs a target query through an input unit 1011. Then, the search unit 1012 implements a traditional keyword based information retrieval in the object base 105 to output search results according to inverted index, as the set of objects to be classified.

The classification result of the query log-based classification means 102 and the classification result of the ontological information-based classification means 103 are outputted respectively as a form of Query List and a form of Concept List, and provided to the semantic fusing means 104 for semantic combination. Finally, the semantic fusing means 104 adjusts Query List and Concept List and outputs the final classification result.

Figure 2:
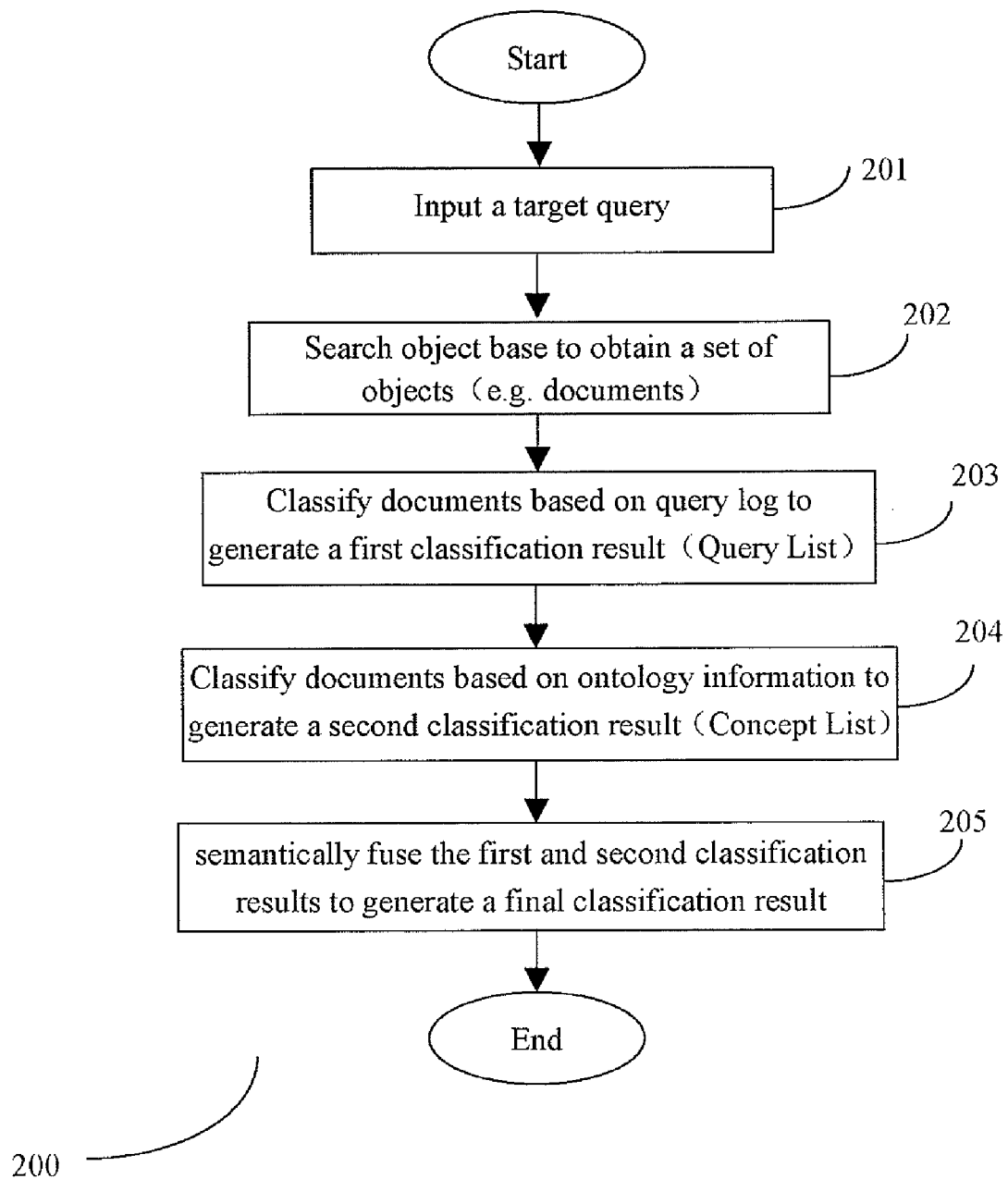
FIG. 2 is a flow chart for showing an example of the operation process of the system 100 shown in FIG. 1.

FIG. 2 is a flow chart for showing an example of the operation process of the system 100 shown in FIG. 1. First, in the step 201, the user inputs a target query through the input unit 1011. In the step 202, the search unit 1012 searches the object base 105 to obtain a set of objects for classification. In the step 203, the query log-based classification means 102 classifies the inputted set of objects (e.g. a set of documents) based on query log to generate a first classification result (i.e. Query List). In the step 204, the ontological information-based classification means 103 classifies documents based on ontological information to generate a second classification result (i.e. Concept List). Finally, in the step 205, the semantic fusing means 104 semantically fuses the first and second classification results to generate a final classification result. Then, the process 200 ends.

Below, the query log-based object classification process will be first described with reference to FIGS. 3 and 4.

Figure 3:
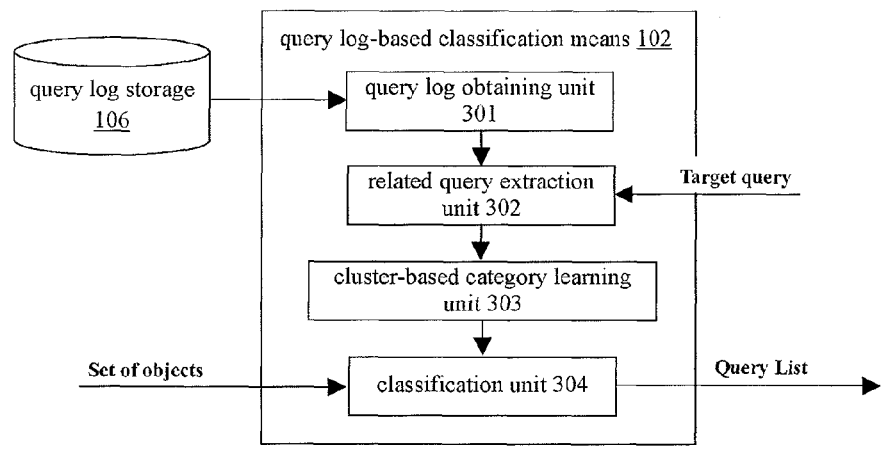
FIG. 3 is a block diagram for showing in more details the internal structure of the query log-based classification means 102 in the system shown in FIG. 1.
Figure 4:
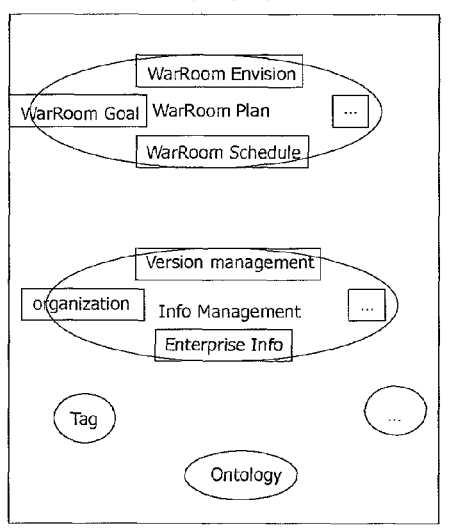
FIG. 4 is a schematic diagram for explaining the query log-based object classification process.
Figure 4:
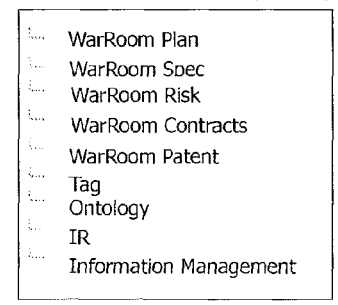

As shown in FIG. 3, the query log-based classification means 102 includes a query log obtaining unit 301, a related query extraction unit 302, a cluster-based category learning unit 303 and a classification unit 304. The query log storage 106 stores query history of the search engine, namely, all the queries inputted by customers and their click through information (mentioned as pseudo documents thereafter). Each query corresponds to for example one pseudo document, for recording which of the search results derived from the query have been clicked by the user and other information such as the times of user clicking.

Firstly, the query log obtaining unit 301 obtains the query log stored in the query log storage 106. The related query extraction unit 302 then extracts related queries according to the similarity between the target query inputted by the user and pseudo documents in the query log obtained by the query log obtaining unit 301. Then, the cluster-based category learning unit 303 clusters all the related queries, and outputs the center of each cluster as a category. These object categories should correspond to the user's interests given by the inputted target query. For example, as shown in FIG. 4, in an example of taking "WarRoom" as the target query, the clustering result can be generated as the left side of the diagram shown, for example. Also, in the Query List shown in the right side of the diagram, the cluster centers WarRoom, Plan, WarRoom Spec, Information Management, Tag, Ontology etc. generated from the clustering strategy on the left are used as object categories.

There is another case, in which for the target query, only one related query, i.e. the target query itself, can be extracted. In this case, names of respective object categories may be generated by only statistically analyzing the returned results. For example, assume that there are totally 100 documents returned for the target query "WarRoom". By title analysis and statistics of word frequency on the 100 documents, there may be three categories names derived, i.e. "Desktop System", "Ontology" and "Automatic Office System". The three categories can be used for the following object classification. Of course, query-based object category generation method is not limited to the examples as described above, which may be based on a query list or a single query. Other relevant technologies that are well known for those skilled in the art can be similarly applied to the present invention.

Then, the classification unit 304 can use any existing classification method to classify the objects (e.g. search results) to different categories. For example, the classification unit 304 can classify search results into different categories according to cosine similarity score between the TF-IDF vector of the search result and the average of all the vectors of the documents in certain category (i.e. a centroid-based method).

Figure 5:
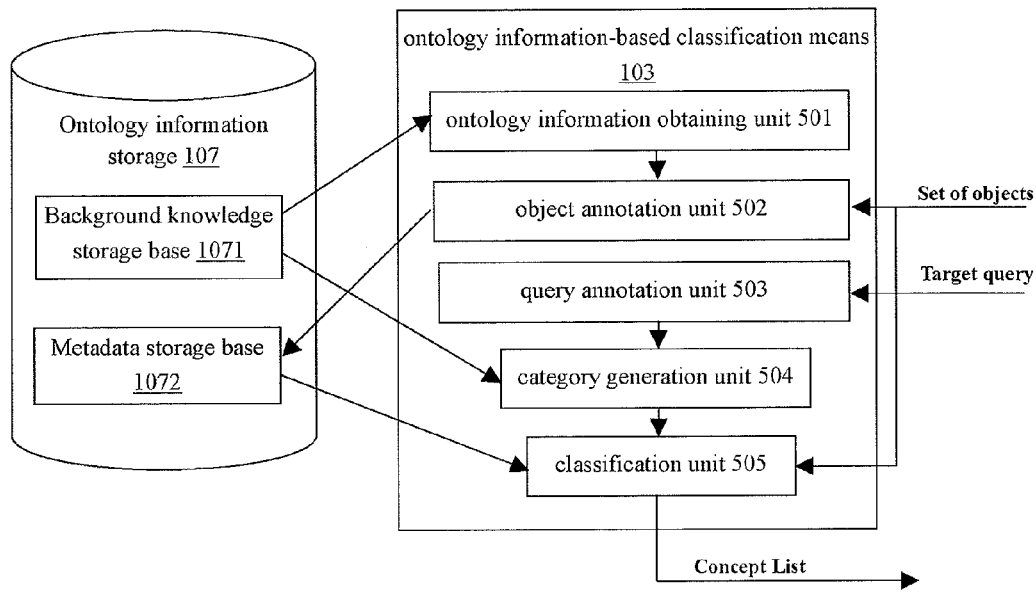
FIG. 5 is a block diagram for showing in more details the internal structure of the ontological information-based classification means 103 in the system shown in FIG. 1.
Figure 6:
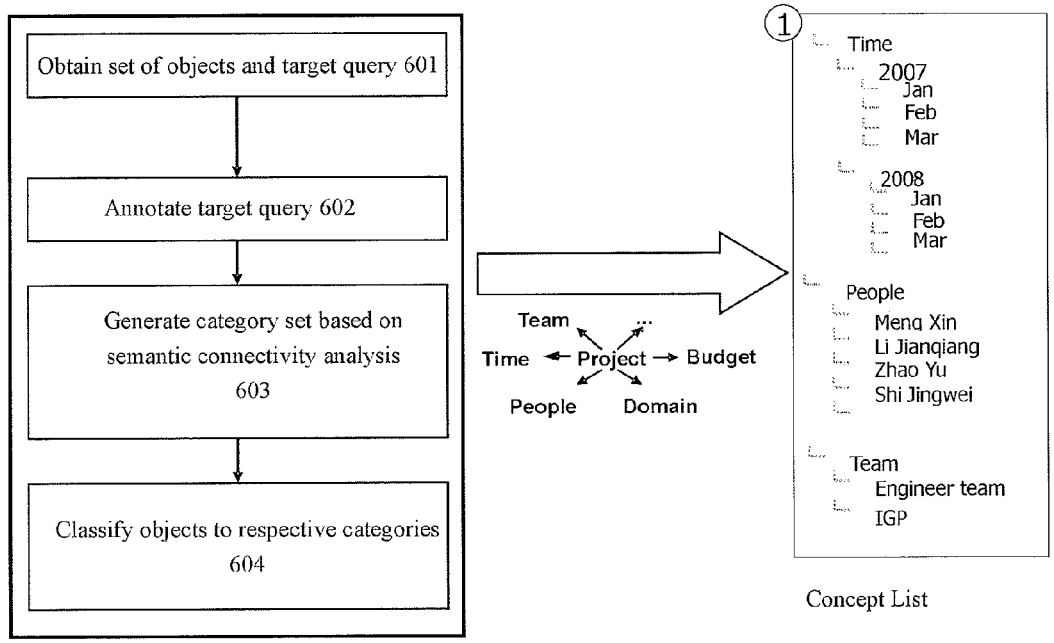
FIG. 6 is a schematic diagram for explaining the ontological information-based object classification process.

FIGS. 5 and 6 show in more detail the ontological information-based object classification means and its operation principle. As shown in FIG. 5, the ontological information-based classification means 103 includes an ontological information obtaining unit 501, a object annotation unit 502, a query annotation unit 503, a category generation unit 504 and a classification unit 505. The ontological information storage 107 is divided into two sections, i.e. a background knowledge storage base 1071 and a metadata storage base 1072. In the example as shown in FIG. 5, first, the ontological information obtaining unit 501 obtains background knowledge from the background knowledge storage base 1071, and provides it to the object annotation unit 502 for objects (e.g. documents) semantic annotation. The object annotation unit 502 obtains the set of objects from outside, semantically annotates the received objects with reference to the background knowledge inputted by the ontological information obtaining unit 501, and stores metadata generated as semantic annotation result in the metadata storage base 1072 for later use. The semantic annotation process performed by the object annotation unit 502 on the set of objects, such as documents, is performed on the back-end, and records the linkage between the entities defined in the background knowledge and the entities appeared in the document.

With reference to the flow chart of FIG. 6, the query annotation unit 503 semantically annotates the keywords present in the target query, e.g. "WarRoom Summary", that is inputted in the step 601, and identifies relationship between entities in the background knowledge and the interested entities in the target query (step 602). For example, the query annotation unit 503 may identify the entity "WarRoom" is an instance of a concept "project" in the background knowledge. Then, in the step 603, the category generation unit 504 extracts a set of appropriate object categories from the background knowledge stored in the background knowledge storage base 1071 according to the semantic related concepts of the annotated target query in the ontology. For example, according to the background knowledge, the category generation unit 504 may identify the concept "project" is related to concepts "Time", "People", "Team" or the like, and thus extracts these concepts as possible object categories. In this way, the category generation unit 504 can generate a Concept List 1 as shown in FIG. 6 for object classification. Finally, in the step 604, the classification unit 505 utilizes the background knowledge as the medium to conduct a semantic connectivity analysis by referring to the metadata related to respective objects that have been stored in the metadata storage base 1072 by the object annotation unit 502, so as to find the appropriate categories for objects classification.

The examples of the query log-based object classification solution and the ontology-based object classification solution have been described in details with reference to FIGS. 3, 4 and 5, 6. As described above, since the query log-based classification method does not take background knowledge into account, the classification accuracy is not good enough. Also, its readability for the user is bad. On the other hand, the category set generated by the ontology-based classification method is inflexible and cannot reflect the change of users interest. Therefore, there is a need to provide an integrated method for combining the two methods together to improve the accuracy and user-friendliness of the object classification.

According to the embodiments of the present invention, in the system 100 as shown in FIG. 1, the operation process of the semantic fusing means 104 includes mainly the following three aspects:

1) adjust the result of query log-based method according to the result of ontology-based method;
2) adjust the result of ontology-based method according to the result of query log-based method; and
3) combine the foregoing two aspects of results to generate a final object classification result.

Below, the operation principle of the semantic fusing process of the semantic fusing means 104 will be described in more details with reference to FIGS. 7-13.

Figure 7:
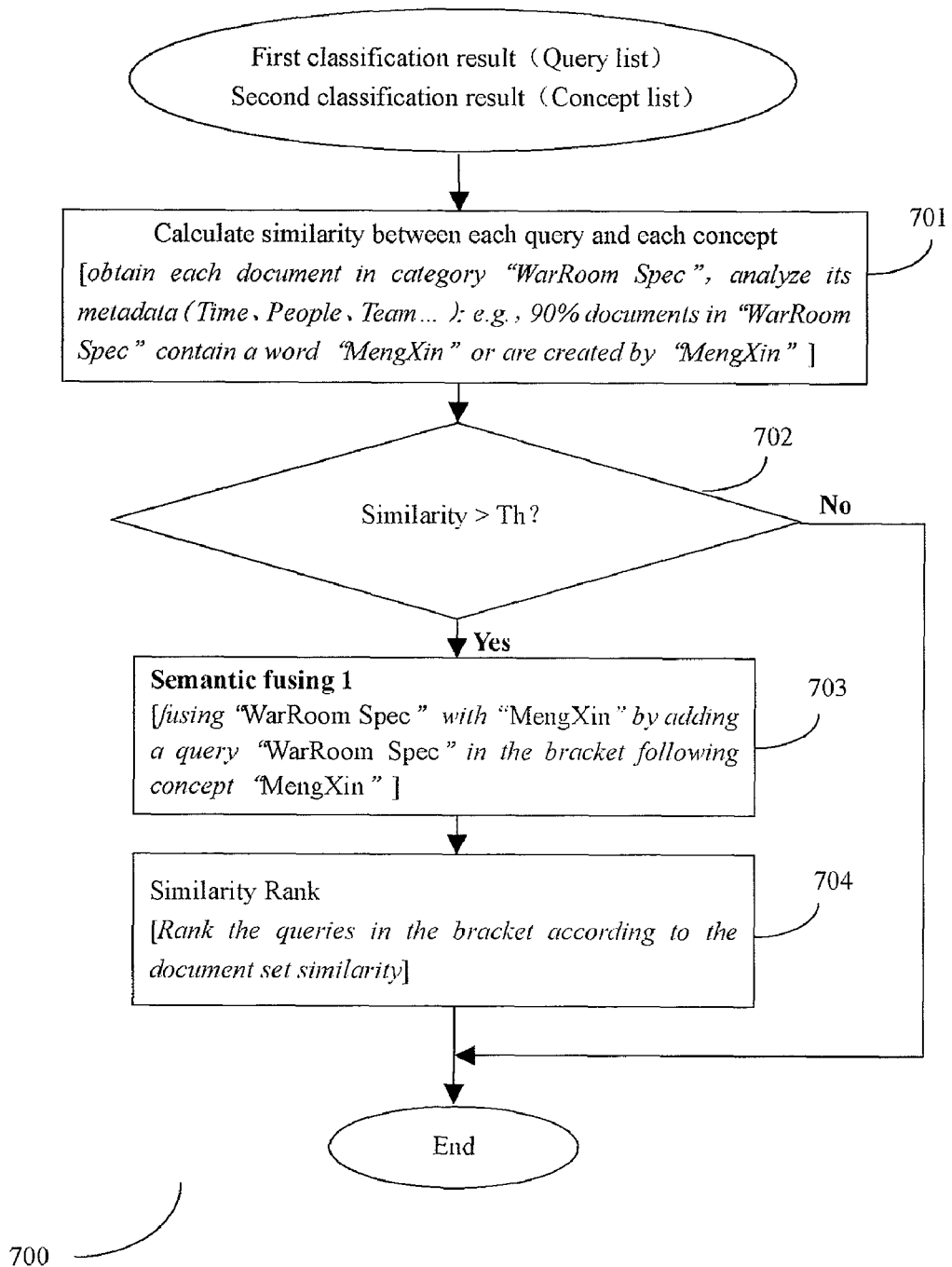
FIG. 7 is a flow chart for showing a first semantic fusing process, during which the classification result of the query log-based method is adjusted with reference to the result of the ontology-based classification method.
Figure 8:
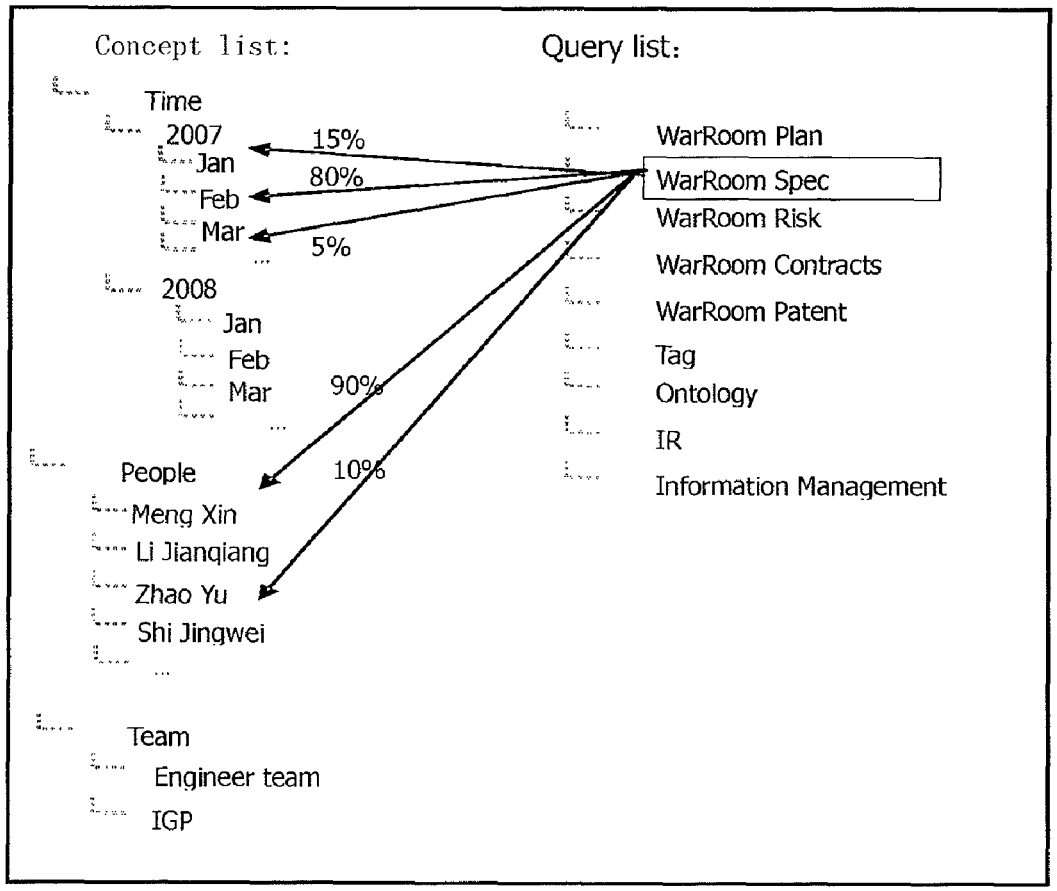
FIGS. 8 and 9 are schematic diagrams for explaining in more details the first semantic fusing process and result shown in FIG. 7.
Figure 9:
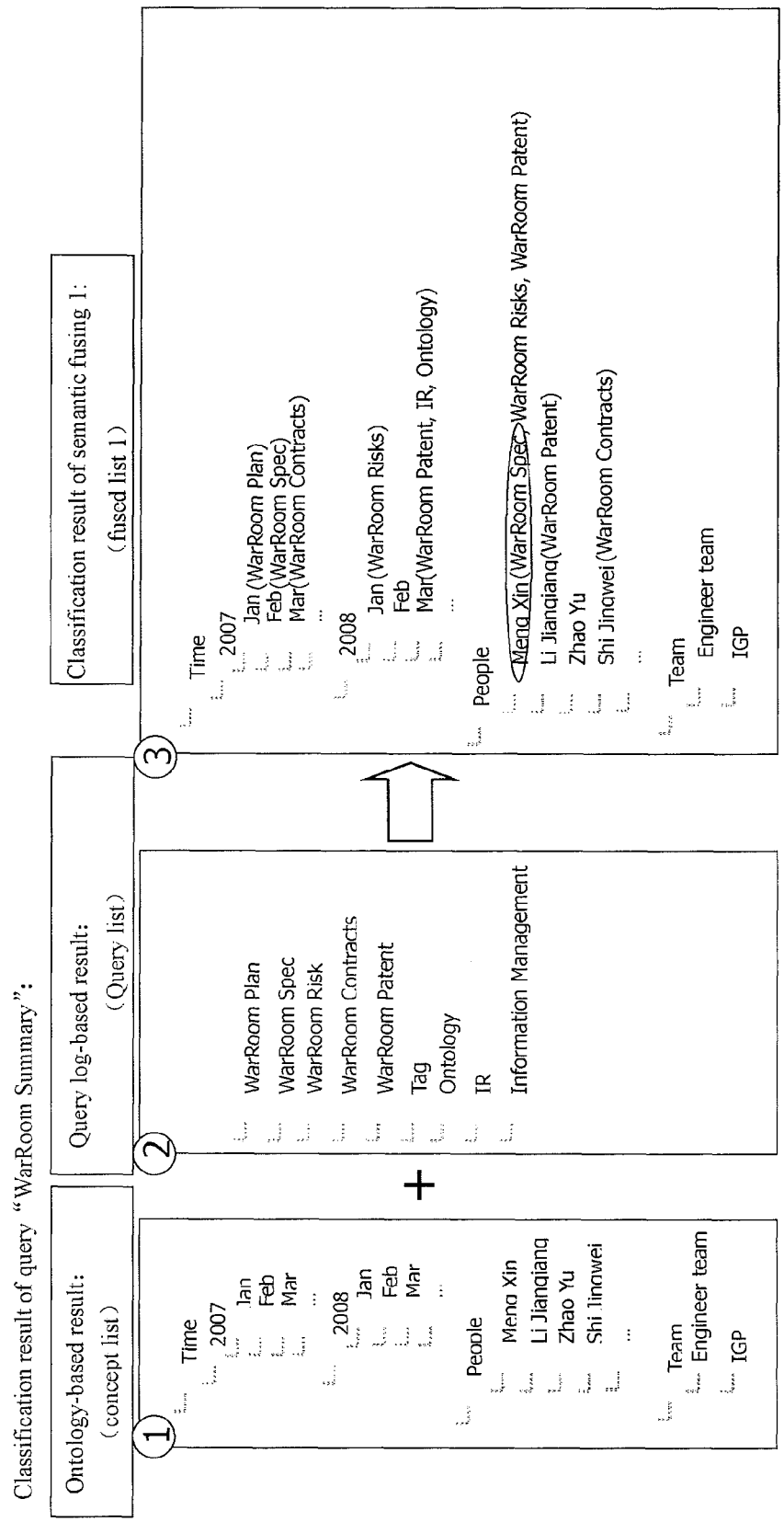

FIG. 7 shows a first semantic fusing process. In this process, the classification result of the query log-based method (i.e. Query List) is adjusted according to the classification result of the ontology-based method (i.e. Concept List). FIGS. 8 and 9 are schematic diagrams for showing the first semantic fusing process of FIG. 7.

As shown in FIG. 7, the semantic fusing means 104 first receives the first classification result (i.e. Query List) and the second classification result (i.e. Concept List) from the query log-based classification means 102 and the ontological information-based classification means 103. The structures of the Query List and the Concept List are for example as shown in FIG. 8. Then, in the step 701, it is first to calculate similarity between each query on the Query List and each concept on the Concept List. For example, in the example of FIG. 8, each document corresponding to the query "WarRoom Spec" in the Query List is obtained, and then the user analyzes its metadata (Time, People, Team . . . ): e.g., 90% documents in the category "WarRoom Spec" contain a word "MengXin" or are created by "MengXin". In this way, it is determined that the similarity between the query "WarRoom Spec" and the concept "MengXin" in the Concept List is 90%. Similarly, the similarities between the query "WarRoom Spec" and the sub-concepts "Jan", "Feb", "Mar" under the concept "Time" are determined to be 15%, 80% and 5% respectively. Next, in the step 702, it is determined whether the calculated similarity is above a predetermined threshold. If so, the first semantic fusing is performed in the step 703. For example, the query "WarRoom Spec" and the concept "MengXin" can be fused by adding a bracket after the concept "MengXin" and adding the query "WarRoom Spec" in the bracket. In the step 704, the queries included in the bracket are ranked according to the similarities calculated in the step 701. Then, the process 700 ends.

FIG. 9 shows a result of the first semantic fusing process. After the first semantic fusing, the semantic framework of the Concept List generated by the ontology-based classification process is added to the Query List generated by the query log-based classification process, thereby leading to the fused list 1 shown in FIG. 9. Through this process, related concepts in the ontological information can be added to the unstable category set of query log based method to generate a more accurate category set and make the accuracy of classification to category meaningful. In addition, since the users can better understand the background knowledge of the ontological information, after the first semantic fusion, a user-friendly display of the classification result can be provided.

Figure 10:
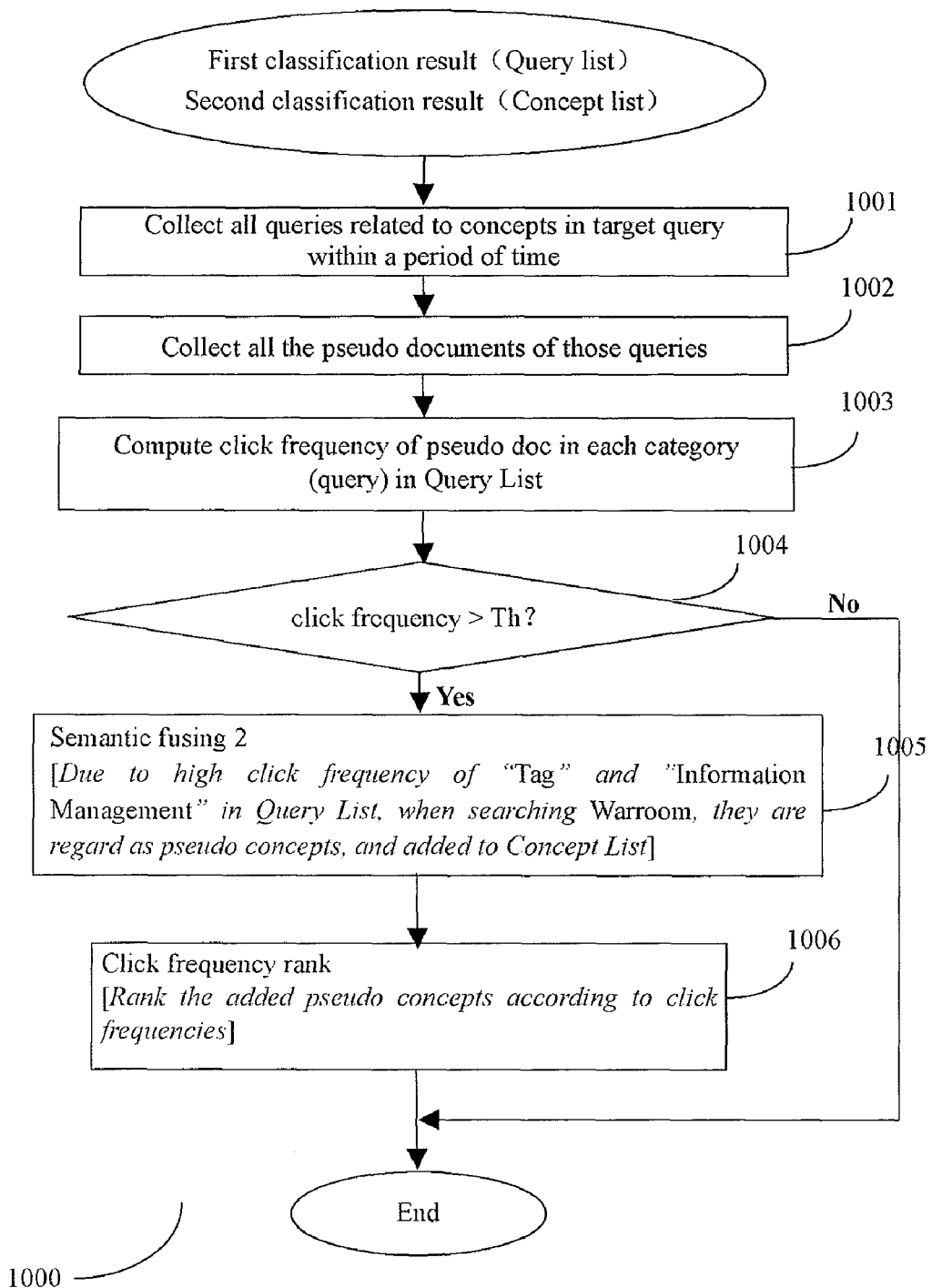
FIG. 10 is a flow chart for showing a second semantic fusing process, during which the classification result of the ontology-based method is adjusted with reference to the result of the query log-based classification method.
Figure 11:
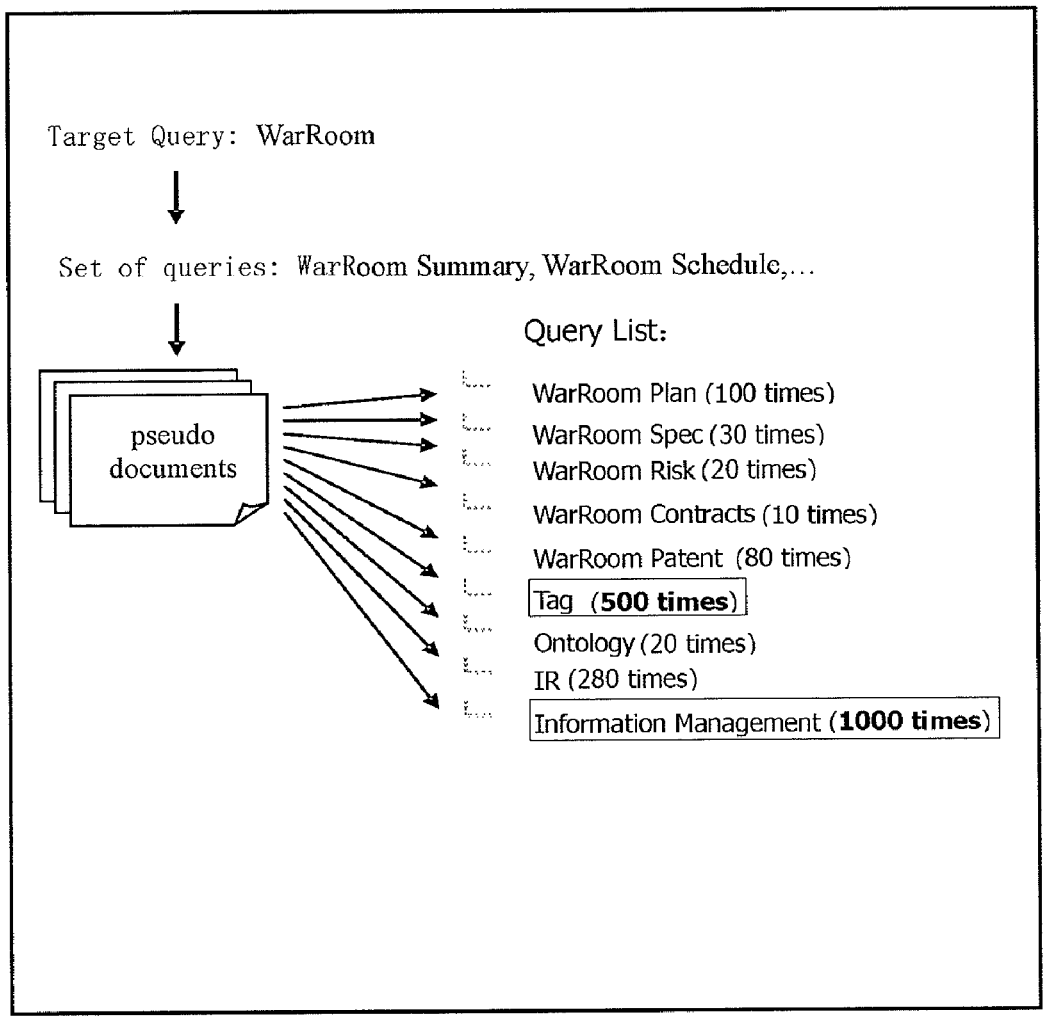
FIGS. 11 and 12 are schematic diagrams for explaining in more details the second semantic fusing process and result shown in FIG. 10.

First, as shown in FIG. 10, the semantic fusing means 104 receives the first classification result (i.e. Query List) and the second classification result (i.e. Concept List) from the query log-based classification means 102 and the ontological information-based classification means 103. Then, in the step 1001, all the queries related to the concept of the target query (e.g. "WarRoom") within a period of time are collected from the ontological information storage 107. In the step 1002, all the pseudo documents related to these queries are collected. In the step 1003, with reference to the pseudo documents corresponding to respective queries, the times of clicking on the search results in each category (i.e. query) in the Query List can be calculated. For example, as shown in FIG. 11, the times of clicking on the search results corresponding to the queries "WarRoom Plan", "WarRoom Spec" in the Query List are calculated to be 100 times, 30 times, and are recorded in the Query List. Then, in the step 1004, it is determined whether the clicking frequency of each query is above a predetermined threshold. If so, a second semantic fusing is conducted in the step 1005, that is, adding query categories having higher clicking frequency to the Concept List. For example, in the example of FIG. 11, since the clicking frequencies of the queries "Tag" and "Information Management" are relatively higher, when searching "WarRoom", these queries are viewed as pseudo concepts and added to the Concept List. Then, in the step 1006, the pseudo concepts that have been added are ranked according to their clicking frequencies.

Figure 12:
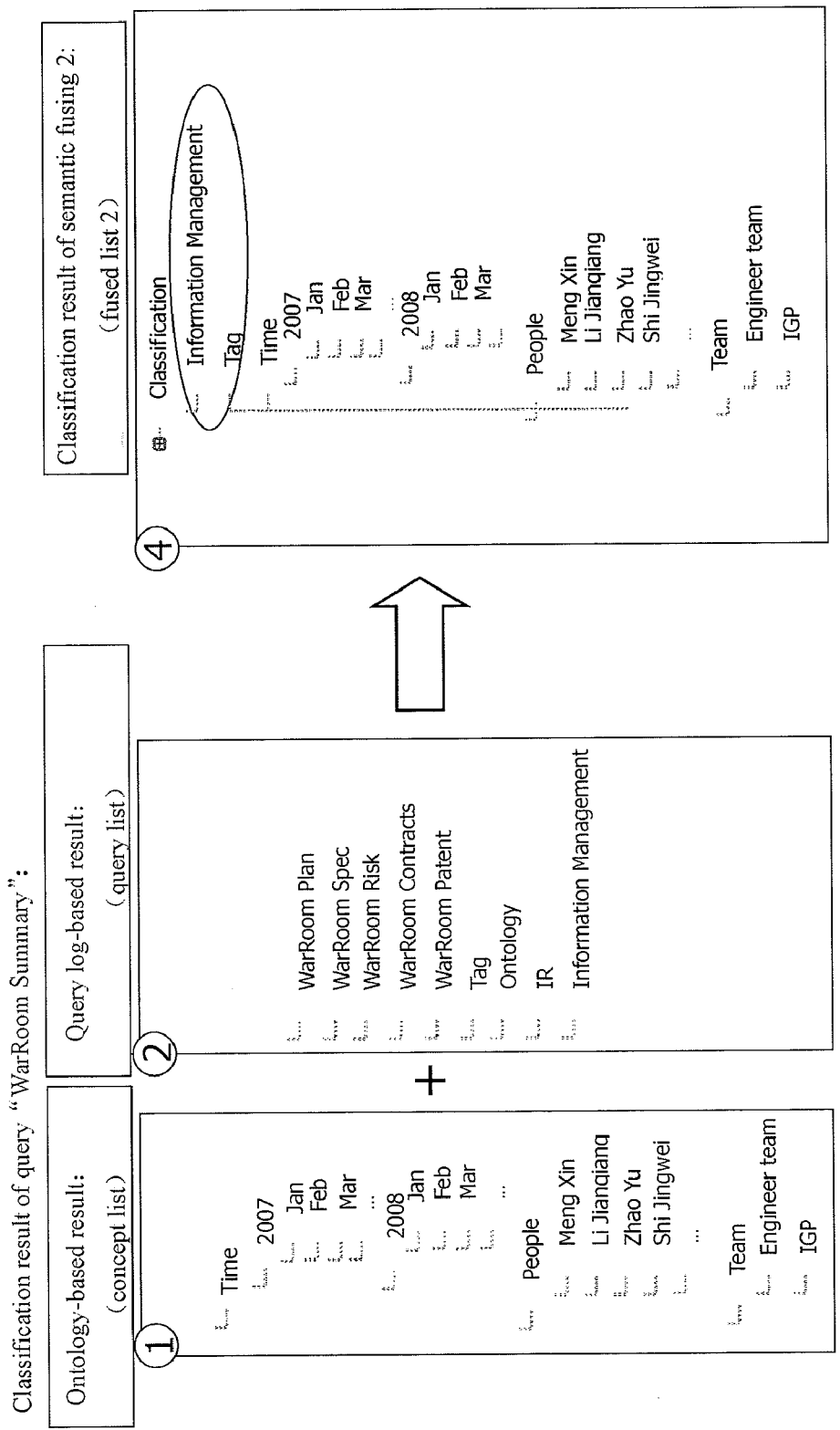

FIG. 12 shows the result of the second semantic fusing process. As shown, by analyzing the Query List generated by the query log-based classification method, the queries "Tag" and "Information Management", which have relatively high clicking frequencies, are added as pseudo concepts to the Concept List generated by the ontology-based classification method, thereby deriving the fused list 2 shown in FIG. 12. In most of the cases, the definition of the ontological information may not be very complete, and cannot reflect change of the user's interests. By using the second semantic fusing process, pseudo concepts generated based on the query history can be added to the Concept List. Therefore, the classification result should be more flexible. In this way, it is possible to solve the rigidity of ontology and to dynamically reflect the change of users' interest.

Figure 13:
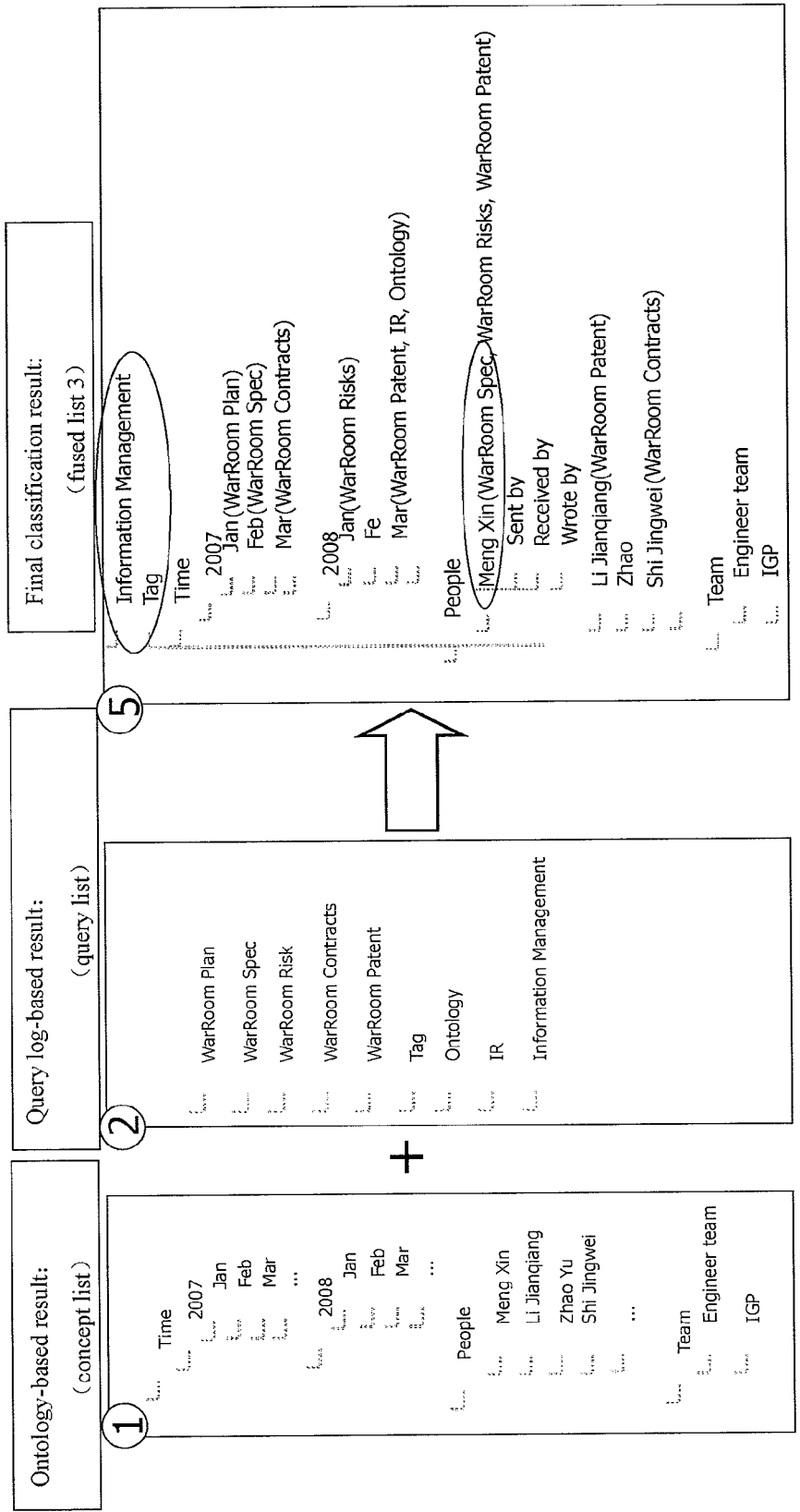
FIG. 13 is a schematic diagram for showing the final semantic fusing result.

Finally, the results of the above-mentioned first and second semantic fusing processes are further combined together to generate a final object classification result. FIG. 13 shows a schematic diagram of the final semantic fusing process. The final result is for example the fused list 3 of FIG. 13. Through the combination of the two semantic fusing results, adjustment and refinement of the ontology-based classification result and the query log-based classification result can be achieved.

According to the present invention, the accuracy and user-friendliness of object (e.g. documents or search results) classification can be improved.

First, from the perspective of user-friendliness, by adding a semantic framework of the Concept List generated based on ontological information to the unstable Query List, the user can understand the semantic attributes of relevant queries more quickly. The approaching of adding relevant pseudo concepts tackles the rigidity of ontology and makes it easier for users to find the most popular and related query results. Moreover, adjusting the rank of each class according to their click frequency reflects the change of the user's interests.

In addition, from the perspective of accuracy, adding a semantic framework (related concepts in ontology) to the unstable category set of query log based method can generate a better category set and make the accuracy of classification to category meaningful. In addition, any search engine would have no query log at the beginning, and the query logs in different domains are totally different, and thus could not be directly used in our engine. Therefore, the ontology-based classification method can compensate for the absence of query log at the beginning step, thereby improving the accuracy of the object classification.

The specific embodiments of the present invention have been described above with reference to the accompanying drawings. However, the present invention is not limited to the particular configuration and processing shown in the accompanying drawings. In the above embodiments, several specific steps are shown and described as examples. However, the method process of the present invention is not limited to these specific steps. Those skilled in the art will appreciate that these steps can be changed, modified and complemented or the order of some steps can be changed without departing from the spirit and substantive features of the invention.

The elements of the invention may be implemented in hardware, software, firmware or a combination thereof and utilized in systems, subsystems, components or sub-components thereof. When implemented in software, the elements of the invention are programs or the code segments used to perform the necessary tasks. The program or code segments can be stored in a machine-readable medium or transmitted by a data signal embodied in a carrier wave over a transmission medium or communication link. The "machine-readable medium" may include any medium that can store or transfer information. Examples of a machine-readable medium include electronic circuit, semiconductor memory device, ROM, flash memory, erasable ROM (EROM), floppy diskette, CD-ROM, optical disk, hard disk, fiber optic medium, radio frequency (RF) link, etc. The code segments may be downloaded via computer networks such as the Internet, Intranet, etc.

Although the invention has been described above with reference to particular embodiments, the invention is not limited to the above particular embodiments and the specific configurations shown in the drawings. For example, some components shown may be combined with each other as one component, or one component may be divided into several subcomponents, or any other known component may be added. The operation processes are also not limited to those shown in the examples. Those skilled in the art will appreciate that the invention may be implemented in other particular forms without departing from the spirit and substantive features of the invention. The present embodiments are therefore to be considered in all respects as illustrative and not restrictive. The scope of the invention is indicated by the appended claims rather than by the foregoing description, and all changes that come within the meaning and range of equivalency of the claims are therefore intended to be embraced therein.

What is claimed is:

1. A method for objects classification, comprising:
    acquiring, by at least one circuit, a set of objects;
    classifying, by the at least one circuit, the objects based on a query log to generate a first classification result;
    classifying, by the at least one circuit, the objects based on ontological information to generate a second classification result; and
    semantically fusing, by the at least one circuit, the first and second classification results to generate a final classification result,
    wherein the semantically fusing comprises adding a semantic element of one of the first classification result and the second classification result to the other of the first classification result and the second classification result, and
    wherein the adding comprises:
        tuning at least one of the first classification result according to the second classification result and the second classification result according to the first classification result, and
        integrating, after the tuning, the first and second classification results to generate the final classification result.

2. The method according to claim 1, wherein the step of acquiring the set of objects comprises:
    inputting a target query;
    searching in an object base according to the target query; and
    outputting search results as the set of objects to be classified.

3. The method according to claim 2, wherein said search in the object base employs a keyword-based information retrieval method.

4. The method according to claim 2, wherein the step of classifying the objects based on the query log comprises:
    obtaining the query log;
    extracting from the query log all the queries related to the target query;
    clustering the extracted related queries and determining a cluster center for each cluster as an object category; and
    classifying all the search results to the respective determined categories.

5. The method according to claim 2, wherein the step of classifying the objects based on ontological information comprises:
    obtaining the ontological information;
    annotating all the objects and the target query with reference to the ontological information;
    generating object categories according to the semantic related concepts of the annotated target query in the ontological information; and
    classifying all the search results to the respective generated categories.

6. The method according to claim 1, wherein:
    the step of tuning comprises:
        tuning the first classification result according to the second classification result, and
        tuning the second classification result according to the first classification result; and
    the step of integrating comprising integrating the tuned first and second classification results to generate the final classification result.

7. The method according to claim 6, wherein the step of tuning the first classification result comprises:
    adding a semantic framework formed in the second classification result to the first classification result.

8. The method according to claim 6, wherein the step of tuning the second classification result comprises:
    adding queries in the first classification result with high click frequency to the second classification result.

9. A system for objects classification, comprising:
    an object acquiring unit comprising a circuitry for acquiring a set of objects;
    a query log-based classification unit comprising a circuitry for classifying the objects based on a query log to generate a first classification result;
    an ontological information-based classification unit comprising a circuitry for classifying the objects based on ontological information to generate a second classification result; and
    a semantic fusing unit comprising a circuitry for semantically fusing the first and second classification results to generate a final classification result, wherein the semantically fusing comprises adding a semantic element of one of the first classification result and the second classification result to the other of the first classification result and the second classification result, and
    wherein the semantic fusing unit tunes at least one of the first classification result according to the second classification result and the second classification result according to the first classification result, and integrates, after the tuning, the first and second classification results to generate the final classification result.

10. The system according to claim 9, further comprising:
    an object base for storing the objects,
    wherein the object acquiring unit comprises:
    an input unit comprising a circuitry for inputting a target query; and a search unit comprising a circuitry for searching in the object base according to the target query and outputting search results as the set of objects to be classified.

11. The system according to claim 10, wherein the query log-based classification unit comprises:
- a query log obtaining unit comprising a circuitry for obtaining the query log;
- a related query extraction unit comprising a circuitry for extracting from the query log all the queries related to the target query;
- a cluster-based category learning unit comprising a circuitry for clustering the extracted related queries and determining a cluster center for each cluster as an object category; and
- a classification unit comprising a circuitry for classifying all the search results to the respective determined categories.

12. The system according to claim 10, wherein the ontological information-based classification unit comprises:
- an ontological information obtaining unit comprising a circuitry for obtaining the ontological information;
- an object annotation unit comprising a circuitry for annotating all the objects that are search results with reference to the ontological information;
- a query annotation unit comprising a circuitry for annotating the target query;
- a category generation unit comprising a circuitry for generating object categories according to the semantic related concepts of the annotated target query in the ontological information; and
- a classification unit comprising a circuitry for classifying all the search results to the respective generated categories.

13. The system according to claim 9, wherein the semantic fusing unit comprises:
- a first tuning unit comprising a circuitry for tuning the first classification result according to the second classification result;
- a second tuning unit comprising a circuitry for tuning the second classification result according to the first classification result; and
- an integration unit comprising a circuitry for integrating the tuned first and second classification results to generate the final classification result.

* * * * *